United States Patent Office 2,773,351
Patented Dec. 11, 1956

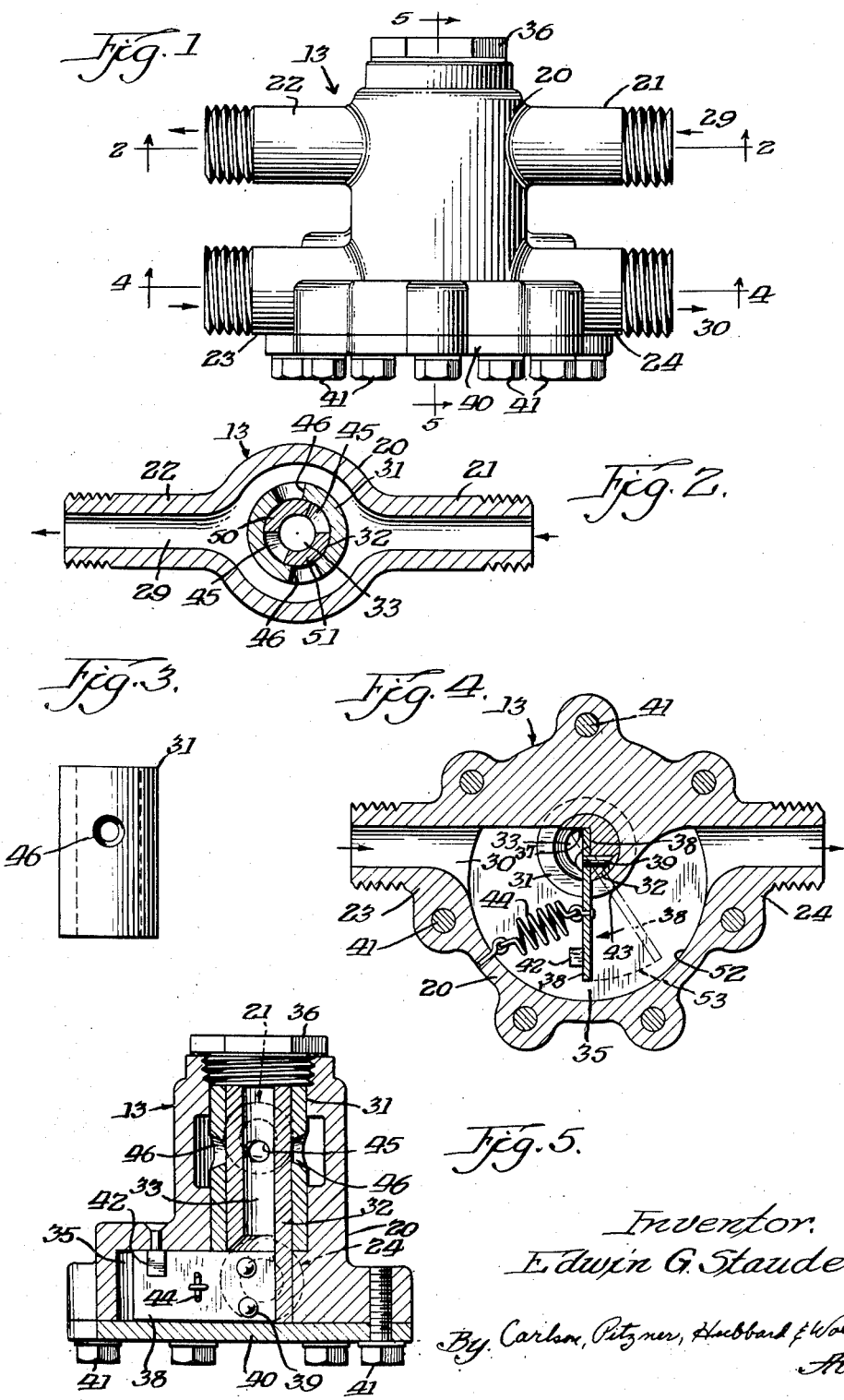

2,773,351
POWER ACTUATED VEHICLE STEERING SYSTEMS

Edwin Gustave Staude, Los Angeles, Calif.

Application December 30, 1955, Serial No. 556,608

12 Claims. (Cl. 60—52)

The present invention relates generally to a pressure fluid operated power steering system and has particular reference to control over the steering effort generated in the system.

It is a general object of the invention to provide a power steering system embodying a power cylinder, means for actuating this cylinder, and means for controlling the steering effort generated in the power cylinder in accordance with the vehicle engine speed.

Another object is to provide control means for effecting the generation of maximum power assist at idle or low vehicle engine speeds, smooth and gradual but progressively increasing reduction in power assist generated as the vehicle engine speed increases uniformly to intermediate speed, and further progressive reduction of the power assist generated in the power cylinder as high vehicle engine speeds are attained.

A further object of the invention is to provide control means responsive to rate of flow of fluid supplied from a pump driven by the vehicle engine and passing through the power cylinder, and thus responsive to vehicle engine speed.

A more detailed object of the invention lies in the provision of a control valve for the pressure fluid supplied to the power cylinder connected in a vehicle steering system, for causing a gradual and progressive reduction in the volume and pressure of fluid supplied to the power cylinder as the vehicle engine speed increases, thus reducing progressively (at a gradually increased rate) the proportion supplied by the power cylinder of the total effort required to move the ground wheels and restoring ground feel to the vehicle steering system. Accordingly, the power cylinder is actuated to supply maximum power to the power steering system for steering at low vehicle speeds or when the vehicle is at a standstill, while at increased speeds the volume and pressure of fluid supplied to the power cylinder decreases progressively, such that at high vehicle speeds sufficient fluid pressure is available to cause the power cylinder to follow the movements of the steering mechanism produced by manual operation, to operate as a means to dampen the steering mechanism, and to provide power in the event of an emergency.

Thus it is an object to provide a valve adapted to be located in the power steering system between the pump and the power cylinder, for progressively reducing the pressure and volume of fluid supplied from the pump to the power cylinder as the vehicle speed increases, by by-passing pressure fluid in progressively increasing flow past the power cylinder in accordance with the rate of flow and pressure of fluid supplied by the pump.

This application is a continuation-in-part of co-pending application Serial No. 528,644, filed August 16, 1955.

The objects of the invention generally set forth together with other objects and ancillary advantages are obtained by the construction and arrangement shown by way of illustration in the accompanying drawings, in which:

Figure 1 is a plan view of a valve embodying the features of the present invention;

Fig. 2 is a vertical section taken substantially in the plane of line 2—2 in Fig. 1;

Fig. 3 is a detail view of an element of the valve illustrated in Fig. 1;

Fig. 4 is a vertical section taken substantially in the plane of line 4—4 in Fig. 1;

Fig. 5 is a section taken substantially in the plane of line 5—5 of Fig. 1;

Figure 6:
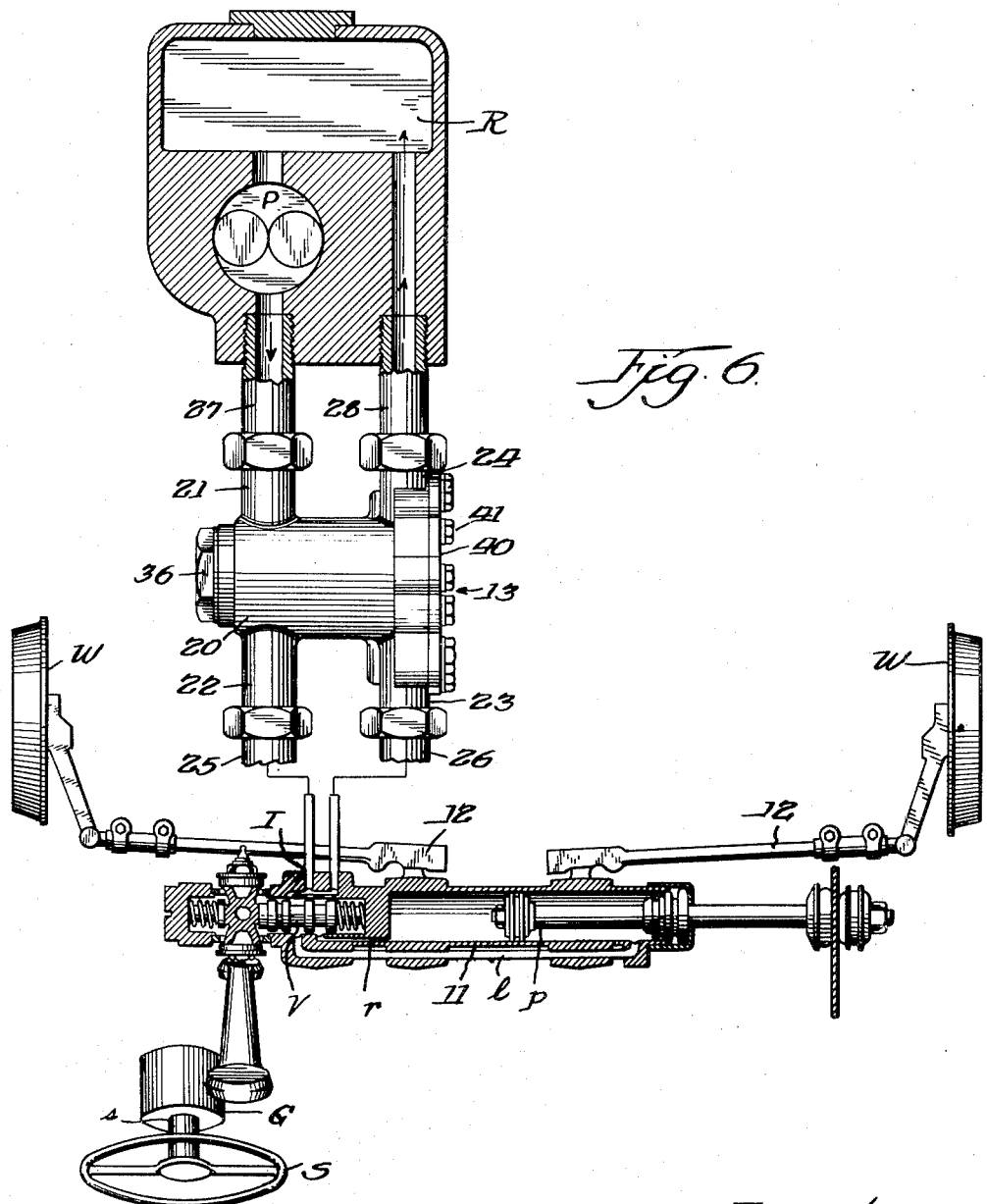
Fig. 6 is a schematic view of a power steering system embodying the features of the present invention with the valve of Fig. 1 incorporated in the system.

While the invention is susceptible of various modifications and alternative constructions, there is shown in the drawings and will be herein described in detail, an illustrative embodiment. It is to be understood, however, that it is not thereby intended to limit the invention to the specific form disclosed. In fact, certain modifications will be hereinafter described whereby the scope of the invention may be more clearly understood, and it is intended to cover all modifications, alternative constructions, and equivalents falling within the spirit and scope of the invention as expressed in the claims.

Referring more particularly to the drawings, the form of the invention there shown for purposes of illustration is embodied in a power steering system of the type shown in Fig. 6. In general, this system is a linkage type with a power cylinder 11 connected to the front drag link or steering linkage 12 of a motor vehicle steering assembly, although it will be understood the invention may be incorporated in power steering systems of other types. The illustrative system also incorporates a pump P, driven by the vehicle engine, which pump constitutes a source providing a variable flow of pressure fluid for the power cylinder or controlled device to generate effort to move the road wheels W.

In the present instance, in the power steering system between the pump and the power cylinder a valve 13 is employed to automatically control the volume and pressure of fluid supplied from the pump P to the power cylinder 11.

Conventional power steering systems, of which the linkage type shown in Fig. 6 is one, include the power cylinder connected in the vehicle steering system for supplementing manual effort supplied through a steering wheel S and gear G to turn the road wheels W.

In general, pressure fluid is conducted from the pump P to the intake I of the power cylinder 11, and the constantly flowing stream of pressure fluid delivered by the pump P circulates within the housing containing the valve V, the pipes $l$ and $r$ communicating with the chambers on each side of the piston $p$, and to the return line to the pump P. Manual rotation of the shaft $s$ by means of the steering wheel S results in a slight axial movement of valve V from a neutral position (as shown) to effect a change in the pressure conditions in the chambers on each side of the piston, the flow into pipes $l$ and $r$ and the respective chambers being throttled by the valve V to obtain the pressure differential for driving the piston $p$ and generating power assist to move the road wheels.

It is well recognized that the effort required to move the road wheels of a motor vehicle is substantially greater when the vehicle is at a standstill or moving at low speeds, for example while parking, than at higher driving speeds. A point is soon reached as the vehicle speed increases where the effort required could easily be supplied exclusively by manual means.

In the operation of the power steering system shown in Fig. 6, which is conventional in this respect, the pump P which delivers fluid under pressure to drive the power cylinder, is a variable delivery type pump driven directly by the vehicle engine. Hence, the output of fluid from the pump P is proportional to the rate of rotation thereof and to the rate of rotation of the vehicle engine. Consequently, as the vehicle speed increases the output of the pump correspondingly increases.

The pump P is generally designed such that when driven by an idling vehicle engine fluid is delivered to the power steering system at a rate of flow and pressure which will produce appreciable force to turn the road wheels. As the vehicle engine speed increases above idling, however, the increased rate of flow and pressure of fluid delivered from the pump overdrives the power cylinder. In a system with no compensating means included, this results in loss of ground feel at increased engine speeds.

"Ground feel" may be defined as sensitivity to force acting against the wheels by the road surface. The presence or absence of "ground feel" is important at driving speeds when if the wheels are turned too sharply, the vehicle may skid or roll over, depending on the condition of the road surface.

The present invention is concerned with means for reducing the pressure of fluid supplied to the power cylinder at driving speeds, and means for insuring that sufficient fluid volume and circulating pressure is directed to the power cylinder so as to eliminate any tendency of the power unit to drag at these speeds and also so as to provide emergency, instantaneously available power to assist the manual means in turning the road wheels.

Accordingly, in one illustrative form of this invention, means are provided for controlling the flow and pressure of fluid supplied to the power cylinder 11 in accordance with the vehicle engine speed. Furthermore, the means provides for reducing the proportion supplied by the power cylinder of the total effort required to move the road wheels at a progressively increasing rate as the vehicle speed is raised, to effect restoration of ground feel to the vehicle steering system.

In the present instance, this means comprises the control valve 13 located in the line between the pump P and reservoir R, and the power cylinder 11 of the power steering system. For connection in the system, the control valve 13 includes a valve housing 20 provided with spaced parallel tubular members 21, 22 and 23, 24, having threaded extremities for convenience in connecting the valve with conduits 25, 26 extending to the power cylinder 11 and conduits 27, 28 extending to the pump P. The central body portion of the housing member 20 is open interiorly to provide communication between the opposite tubular members, which form in the valve housing, parallel inlet and outlet passages 29, 30, respectively, extending through the body of the valve housing 20.

In addition to the parallel inlet and outlet passages, the body of the valve housing 20 is provided with a by-pass passage arranged to communicate between the inlet and outlet passages 29, 30. In the present instance, the by-pass passage is formed within a sleeve 31 pressed into position or otherwise secured in place in the body of fthe housing 20.

Thus, inlet and outlet passages 29, 30, respectively, are formed in the body of the valve housing 20 and means are provided for connecting the valve housing with conduits extending to the pump and power cylinder of the power steering system and hence, in the line between the pump and the power cylinder. By means of the construction illustrated, fluid under pressure is supplied from the pump through inlet passage 29 to the intake I to the power cylinder 11, while exhaust fluid from the power cylinder is returned through outlet passage 30 to the pump.

In the illustrative control valve, means are provided to open and close the by-pass passage communicating between the inlet passage 29 and outlet passage 30 connected between the pump P and the power cylinder 11. Furthermore, the means are so arranged that as the rate of flow of fluid supplied to the power cylinder through the control valve increases, the by-pass passage is gradually and smoothly opened to admit fluid thereto and by-pass the power cylinder in progressively increasing amounts. Consequently, as the vehicle speed increases, the pressure of fluid supplied to the power cylinder is progressively reduced, until a point is reached where substantially the entire effort required to move the road wheels is supplied exclusively through the manual operated means.

As shown in Figs. 1–5 of the drawings, this means comprises a rotatable balanced valve element 32 mounted within the sleeve 31 and provided with a central bore 33 substantially circular in cross-section.

One end of the bore 33 communicates with a cavity 35 in the valve housing 20 which connects the opposite tubular members 23, 24 respectively, forming the outlet passage 30 in the housing 20 of the control valve.

The inlet passage side of the control valve housing 20 is also open interiorly to connect the opposite tubular members 21, 22 respectively, making up the inlet passage 29 through the valve housing. The rotatable balanced valve element 32 extends completely across the space formed in the inlet passage side of the valve housing, and abuts the screw cap 36 which serves to prevent the valve element from axial motion and effectively retains the valve element in place within the sleeve 31. The valve element 32 also extends across the cavity 35 in the outlet passage 30, and means are provided thereon to actuate the valve element 32 in accordance with the rate of flow of fluid passing through the outlet passage. Thus within the housing 20, the portion of the valve element 32 which extends across the cavity 35 is notched at 37 to carry a vane 38 adapted to be moved in accordance with the pressure and rate of flow of fluid passing through the outlet passage 30. In the preferred form of the invention illustrated, the vane 38 is fastened to the valve element 32 by means of rivets 39 or the like, and is formed of a substantially rectangular member corresponding generally to the interior configuration of the cavity 35 and abutting the sides of the cavity and thus against the inner surface of a cover 40 closing the outlet passage side of the valve housing, and fastened in place by bolts 41.

In order to provide for the passage of fluid through the cavity 35 and outlet passage 30, past the vane 38, the end of the vane terminates a short distance from the peripheral wall of the cavity 35. In the form of the invention illustrated, the vane may swing from one position against a stop 42, carried by one wall of the cavity, to a second position against a stop 43 formed by a flange extending completely across the cavity in the outlet passage. The position of the vane against the stop 42, as shown in Fig. 4, corresponds to the closed position of the valve element, and normally the vane is held in this position by means of a spring 44, which is selected to exert sufficient force to prevent the vane from moving until a certain minimum pressure and rate of flow of fluid is reached in the outlet passage, which may readily be determined for the particular power steering system in which the invention is to be incorporated.

The position of the vane against the flange 43 (dotted Fig. 4) corresponds to the open position of the valve element disposed in the by-pass passage, and in the illustrative form of the invention shown, gradual uniform rotation of the valve element upon or accompanying gradual and uniform increase in the rate of flow and pressure of fluid passing through the outlet passage, causes a smooth and progressive increase in the rate of admission of fluid through the by-pass passage from the inlet passage to the outlet passage in the valve housing.

In the present instance, pressure fluid from the inlet passage is admitted to the bore 33 within the valve element 32, by way of passages formed in the sleve 31 and in the valve element 32. The valve element has been described hereinbefore as a balanced valve element, and accordingly the sleeve 31 and the portion of the valve element extending across the inlet passage are provided with oppositely disposed passages adapted to register upon the valve element being rotated to open the by-pass passage. As noted previously, the by-pass passage is opened upon movement of the vane away from the stop 42, such movement accompanying increase in rate of flow and pressure of fluid passing through the outlet passage 30.

More specifically, the valve element is drilled and counterbored to provide radial passages 45 extending outwardly from the central longitudinal bore 33 therein and adapted for registration with openings 46 in the sleeve 31. By counterboring, the mouth of each of the passages 45 disposed on opposite sides of the valve element 32 is enlarged to encompass the openings 46 formed in the sleeve 31 and providing the passage therethrough for admission of fluid to the interior of the valve element.

In the construction and arrangement illustrated, fluid is admitted in progressively increasing amounts from the inlet passage to the bore 33 formed in the valve element 32. In the operation of the valve depicted in the drawings, uniform rotational movement of the valve element 32 causes the passages 45 therein to be gradually thrown into communication with the openings 46 in the sleeve, thus increasing the effective area of the passage communicating with the inlet passage 39 and extending to the bore centrally of the valve element and forming the by-pass passage. Upon uniform movement of the valve element 32, progressively increasing amounts of fluid are admitted into the bore within the valve element 32 to by-pass the power cylinder connected in the power steering system.

Accordingly, the valve element 32 is mounted for rotation within the valve housing 20 between a normally closed position (Figs. 2 and 4) and an open position. The vane 38 is held against the stop 42 by means of a spring 44 normally urging the valve closed and the radial passages 45 are then out of registration with the openings 46 in the sleeve 31. The open position of the valve follows movement of the vane counterclockwise as viewed in Fig. 4 to the dotted position against flange 43, where the passages and openings in the valve element and sleeve respectively are in registration. In the closed position of the valve, with the admission of fluid through the by-pass passage interrupted, the portions of the valve element 32 which might be termed cut-off portions 50, 51, circumferentially between the mouths of the passages 45, block the openings 46 in the sleeve 31 and prevent the admission of fluid to the by-pass passage formed by the bore 33 through the valve element.

In the present instance, the openings in the sleeve and the passages formed in the valve element overlap in progressively increasing amounts incident to rotation of the valve element in order that a uniform rate of increase of fluid delivered from the pump accompanying uniform rate of increase in engine speed causes fluid to be admitted through the by-pass passage in progressively increasing amounts and the pressure of fluid supplied to the power cylinder to be reduced at a rate greater than the rate of increase in engine speed or the rate of increase of fluid delivered by the pump. To facilitate further obtaining a non-linear relation between the output of the pump and the amount of fluid by-passed past the power cylinder, hereinbefore stated in terms of "progressive" increase or decrease, the radius of the inside peripheral surface 52 of the cavity 35 in the outlet passage, is constructed from a different center than the axis of rotation of the vane. Thus as the vane moves counterclockwise along the arc 53 shown in dotted lines in Fig. 4 the clearance between the end of the vane and the peripheral wall of the cavity decreases. Accordingly, a unit increase in pressure and rate of flow of fluid at high levels of pump output produces a greater movement of the valve element than the same unit increase at low levels of pump output. It is noted, however, that even in the extreme counterclockwise position of the vane as viewed in Fig. 4, clearance is provided between the end of the vane and the peripheral wall of the cavity 35 to permit the flow of fluid past the vane and prevent the creation of a back pressure in the outlet passage to unduly affect the operation of the power unit.

In the operation of a system having the control valve incorporated therein, little or no effect is produced upon the rate of flow and pressure of fluid supplied to the power cylinder at low levels of pump output. As the pump output increases, however, the valve element is rotated to admit fluid from the inlet passage through the by-pass passage to the outlet passage, effectively by-passing the power cylinder. Thus at low engine and pump speeds fluid at a pressure and rate of flow determined by the operating characteristics of the pump will be supplied to the power cylinder, and the operation of the power steering system will be as in a conventional system. As the engine speed increases, the output of the pump correspondingly increases and the rate of flow and pressure of the fluid passing into the power cylinder, through the return line and thus through the outlet passage of the control valve, increases correspondingly, to move the vane disposed in the outlet passage counterclockwise as shown in Fig. 4 and to gradually admit fluid in progressively increasing amounts through the by-pass passage of the control valve.

Accordingly, the effort produced by the power cylinder upon increase in vehicle engine speed, is progressively and rapidly reduced at a rate greater than the rate of reduction of total effort required to turn the road wheels as the vehicle speed increases. The portion supplied by the power cylinder of the total effort required to move the road wheels is correspondingly reduced, until a point is reached, as for example, with the vane against the stop 43 in the counterclockwise position depicted in dotted lines in Fig. 4, where substantially the entire effort required to move the road wheels is supplied by the manually operated steering wheel and gear.

The vehicle speed at which the control valve begins actuation, may be determined by the strength of the spring 44, the width and length of the vane 38, and the configuration of the cavity 35 in which the vane is mounted.

Other modifications, to produce readily predictable changed operating characteristics of the valve, may be effected without departing from the present invention, and it is intended that the scope of the present invention be limited only by the appended claims.

I claim as my invention:

1. In a fluid volume control valve for a motor vehicle power steering system having a power unit operated by a pump driven by the engine of the motor vehicle, the combination comprising a control valve housing having inlet and outlet passages and a by-pass passage therebetween, said inlet passage being provided for connection in the line between the pump and the intake to the power unit, and said outlet passage being provided for connection in the return line from the power unit to the pump, valve means in said by-pass passage, and means responsive to rate of flow of fluid from the pump for opening said valve means to draw off fluid through said by-pass passage from the inlet passage at relatively high vehicle engine speeds and correspondingly relatively high rate of flow and for closing said valve means to cut off said by-pass passage at relatively low vehicle engine speeds and correspondingly relatively low rate of flow of fluid from the pump, whereby to reduce the flow of fluid supplied to the power unit from a maximum supplied at said relatively low engine speeds when said valve means is closed.

2. In a fluid volume control valve for a motor vehicle power steering system having a power unit operated by a pump driven by the engine of the motor vehicle, the combination of a control valve housing having inlet and outlet passages and a by-pass passage therebetween, said inlet passage being provided for connection in the line between the pump and the intake to the power unit, and said outlet passage being provided for connection in the return line to the pump, a valve element supported in said by-pass passage, a vane pivotally mounted in said outlet passage in the path of fluid passing through said passage, a resilient member urging said vane against the pressure of the fluid, said vane forming a flow responsive actuating device for said valve element, said vane actuating the valve element to draw off fluid through said by-pass passage from the inlet passage during periods of relatively high rate of flow of fluid from the pump, and to cut off said by-pass passage during periods of relatively low rate of flow, whereby to provide for maximum pressure of fluid supplied to the power unit during said periods of relatively low rate of flow and reduction in pressure of fluid from said maximum pressure as rate of flow increases.

3. In a fluid volume control valve for a motor vehicle power steering system having a power unit operated by a pump driven by the engine of the motor vehicle, the combination of a control valve housing having inlet and outlet passages and a by-pass passage therebetween, said inlet passage being provided for connection in the line from the pump to the intake to the power unit and said outlet passage being provided for connection in the return line from the power unit, a valve element supported in said by-pass passage, a chamber formed in said housing communicating with said outlet passage, a vane pivotally mounted in said chamber, said vane forming a flow responsive actuating means for said valve element for opening said valve element and drawing off fluid through said by-pass passage from the inlet passage during periods of relatively high rate of flow of fluid through the outlet passage, and to cut off said by-pass passage during periods of relatively low rate of flow, whereby to provide for maximum pressure of fluid supplied to the power unit during said periods of relatively low rate of flow and reduction in pressure as rate of flow increases.

4. In a fluid volume control valve for a motor vehicle power steering system having a power unit operated by a pump driven by the engine of the motor vehicle, the combination of a control valve housing having spaced longitudinally arranged inlet and outlet passages and a transverse by-pass passage therebetween, said inlet passage being provided for connection in the line from the pump to the intake to the power unit and said outlet passage being provided for connection in the return line from the power unit, chambers formed in said housing to enlarge said inlet and outlet passages and arranged adjacent the extremities of the by-pass passage, a valve element supported in said by-pass passage including a sleeve mounted in the passage extending into the chamber provided to enlarge the inlet passage, said sleeve having openings for communicating between the chamber and the inside of the sleeve, a rotatable member supported inside said sleeve to extend into the chamber formed to enlarge the oulet passage, said member having a bore therein communicating with said chamber and openings between the bore and the outside of the member adapted to be moved into and out of alignment with the openings in said sleeve, a vane in the chamber formed to enlarge said outlet passage, said vane being carried by said rotatable member, a spring urging said vane and said rotatable member to a cut-off position of the valve element where the openings in the member and the openings in the sleeve are out of alignment, whereby increase of flow of fluid through the chamber formed to enlarge the outlet passage past said vane rotates said vane against the spring to bring into alignment the openings in said sleeve and said member, to open the valve element and draw off fluid through the by-pass passage to the outlet passage.

5. In a fluid volume control valve for a vehicle power steering system having a power unit connected to the vehicle steering system operated by a pump driven by the engine of the vehicle, the combination comprising a control valve housing having inlet and outlet passages and a by-pass passage therebetween, said inlet passage being provided for connection in the line from the pump to the intake to the power unit and said outlet passage being provided for connection in the return line from the power unit, a normally closed valve element supported in said by-pass passage, and means for actuating said valve element responsive to the rate of flow of fluid passing through said control valve housing, for opening said valve element progressively and drawing off fluid through said by-pass passage from the inlet passage in progressively increasing amounts as the vehicle engine speed increases above a predetermined minimum speed to reduce the pressure of fluid supplied to the power unit and reduce the effort generated in the power unit progressively as the vehicle speed increases above said minimum speed.

6. In a fluid volume control valve for a system having a controlled device operated by a source providing a variable flow of pressure fluid, the combination comprising, an intake passage for receiving pressure fluid from said source and providing a first outlet for supplying pressure fluid to the controlled device, a return passage for receiving exhaust fluid from the controlled device and providing a second outlet for returning said exhaust fluid to said source, a balanced valve element located in said intake passage effective upon opening to control rate of flow of pressure fluid to said controlled device by diverting flow from said intake passage to said return passage, a movable actuating member located in said return passage and operatively connected to said valve element, said member being responsive to flow of exhaust fluid from the controlled device and to flow of fluid diverted by said valve element from said intake passage, and resilient means connected to said member to urge said member into an inactive position whereby said valve element is closed.

7. In a fluid volume control valve for a system having a controlled device operated by a source providing a variable flow of pressure fluid, the combination comprising, an intake passage for receiving pressure fluid from said source and providing a first outlet for supplying pressure fluid to the controlled device, a return passage for receiving exhaust fluid from the controlled device and providing a second outlet for returning said exhaust fluid to said source, a normally closed valve element connecting said intake passage with said return passage effective upon opening to control rate of flow of pressure fluid to said controlled device by diverting flow from said intake passage to said return passage, a movable vane mounted in said return passage, said movable vane being operatively connected to said valve element, a limit stop for said vane, and resilient means for urging said vane against said stop to maintain said valve element normally in closed position.

8. In a fluid volume control valve for a system having a controlled device operated by a source providing a variable flow of pressure fluid, the combination comprising, a passage for pressure fluid providing an intake and an outlet to the controlled device, an exhaust fluid passage providing an inlet from the controlled device and an outlet for returning the exhaust fluid to said source, a normally closed hollow balanced valve element located in the pressure fluid passage and connecting the same with the exhaust fluid passage, a movable vane located in said exhaust fluid passage and in the path of flow of exhaust fluid and of flow through said hollow valve element, said movable vane being operatively connected to said valve element, a limit stop for said vane, and means for urging said vane against said stop to maintain said valve element normally in closed position.

9. In a fluid volume control valve for a system having a controlled device operated by a source providing a variable flow of pressure fluid, the combination comprising, a housing having a passageway for connection in the line between said source and said controlled device, a by-pass passage in said housing opening into said passageway, a valve element mounted in said housing to control rate of flow to said controlled device by diverting flow from said source through said by-pass passage, a movable actuating member for said valve element subjected to flow to said controlled device and through said by-pass passage, said member being responsive to rate of flow and operable to actuate said valve element to reduce rate of flow to said controlled device upon increase above a predetermined velocity of flow acting against said actuating member.

10. In a motor vehicle pressure fluid operated power steering system having a power unit connected to the vehicle steering linkage, and a variable delivery pump driven from the engine of the motor vehicle and providing a source of pressure fluid for the power unit, the flow from said pressure fluid source varying in accordance with the engine speed, a flow responsive control valve for diverting fluid from the power unit only upon the engine speed and flow from the pump attaining a predetermined rate, whereby the flow of fluid supplied to the power unit and the steering effort generated therein at engine speeds above the said predetermined rate is reduced from a maximum attained at said predetermined rate, said control valve including a by-pass for diverting fluid from the power unit, an actuating member responsive to rate of flow of fluid from the pump, and a valve element for said by-pass operated by said actuating member, said actuating member and valve element being effective to open said by-pass only upon flow from the pump attaining said predetermined rate.

11. In a motor vehicle pressure fluid operated power steering system having a power unit connected to the vehicle steering linkage, and a variable delivery pump driven from the engine of the motor vehicle and providing a source of pressure fluid for the power unit, the flow from said pressure fluid source varying in accordance with the engine speed, a flow responsive control valve for diverting fluid from the power unit only upon the engine speed and flow from the pump attaining a predetermined rate, whereby the flow of fluid supplied to the power unit and the steering effort generated therein at engine speeds above the said predetermined rate is reduced from a maximum attained at said predetermined rate, said control valve including a control valve housing having a passageway for connection in the line between said source and the power unit, a by-pass passage in said housing opening into said passageway for diverting fluid from the power unit, a valve element for said by-pass passage mounted in said housing, and a movable actuating member for said valve element subjected to flow of exhaust fluid from said power unit and flow of fluid diverted from said power unit through said by-pass passage, said actuating member and valve element being effective to open said by-pass passage only upon flow from the pump attaining said predetermined rate.

12. In a motor vehicle pressure fluid operated power steering system having a power unit connected to the vehicle steering linkage, and a variable delivery pump driven from the engine of the motor vehicle and providing a source of pressure fluid for the power unit, the flow from said pressure fluid source varying in accordance with the engine speed, a flow responsive control valve for diverting fluid from the power unit only upon the engine speed and flow from the pump attaining a predetermined rate, whereby the flow of fluid supplied to the power unit and the steering effort generated therein at engine speeds above the said predetermined rate is reduced from a maximum attained at said predetermined rate, said control valve including a housing, a by-pass passage in said housing for diverting fluid from the power unit, a valve element for said by-pass passage mounted in said housing, a return passageway for connection in the return line between said source and the power unit and into which said by-pass passage opens, and a movable actuating member for said valve element mounted in said housing so as to be subjected to flow of exhaust fluid from the power unit through said return passageway and flow of fluid diverted from the power unit through said by-pass passage, said actuating member and valve element being effective to open said by-pass passage only upon flow from the pump attaining said predetermined rate.

References Cited in the file of this patent

UNITED STATES PATENTS

| | | |
|---|---|---|
| 963,906 | Larsson | July 12, 1910 |
| 2,028,766 | Ernst et al. | Jan. 28, 1936 |
| 2,603,065 | Sarto | July 15, 1952 |
| 2,707,375 | Hammond | May 3, 1955 |
| 2,733,662 | Hunter | Feb. 7, 1956 |
| 2,734,589 | Groen | Feb. 14, 1956 |

FOREIGN PATENTS

| | | |
|---|---|---|
| 512,426 | Great Britain | Sept. 15, 1939 |